United States Patent [19]

Wisniewski et al.

[11] Patent Number: 4,701,249

[45] Date of Patent: Oct. 20, 1987

[54] MOBILE APPARATUS FOR CLEANING REMNANTS OF CARBON ANODE BLOCKS

[75] Inventors: Paul Wisniewski; Franz Golla, both of Lünen, Fed. Rep. of Germany

[73] Assignee: Gewerkschaft Eisenhutte Westfalia GmbH, Lünen, Fed. Rep. of Germany

[21] Appl. No.: 895,634

[22] Filed: Aug. 12, 1986

[30] Foreign Application Priority Data

Aug. 31, 1985 [DE] Fed. Rep. of Germany ....... 3531161
May 27, 1986 [DE] Fed. Rep. of Germany ....... 3617820

[51] Int. Cl.$^4$ .............................................. C25C 3/14
[52] U.S. Cl. ..................................... 204/279; 204/245
[58] Field of Search ...................... 204/67, 243 R–247, 204/279, 240, 297 R

[56] References Cited

U.S. PATENT DOCUMENTS

| | | | |
|---|---|---|---|
| 4,119,505 | 10/1978 | Baillot et al. | 204/245 X |
| 4,469,281 | 9/1984 | Røed | 204/67 X |
| 4,510,033 | 4/1985 | Martin et al. | 204/245 |
| 4,585,538 | 4/1986 | Bachmann | 204/245 X |

Primary Examiner—Donald R. Valentine
Attorney, Agent, or Firm—Sughrue, Mion, Zinn, Macpeak and Seas

[57] ABSTRACT

A mobile anode-block cleaning machine has a steerable workshop floor vehicle provided with its own propulsion system and with a cleaning cabin in which anode remnants are freed from melt incrustations with the aid of a separator. The cleaning operation is completed in a chamber, closed to the exterior, provided in the cleaning cabin, the chamber air expediently being cleaned with the aid of a filter. The machine also has a collecting chamber for the storage of the incrustations separated from the anode remnants.

28 Claims, 13 Drawing Figures

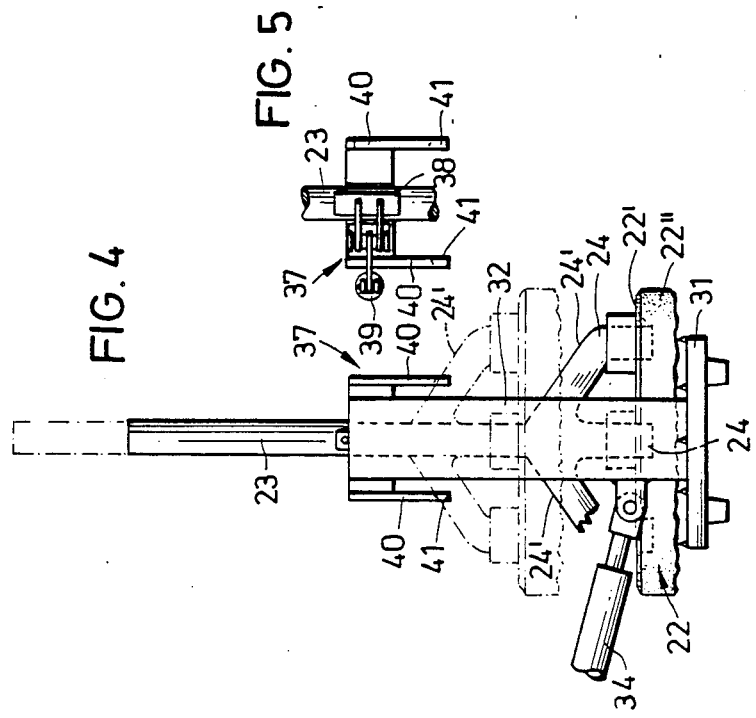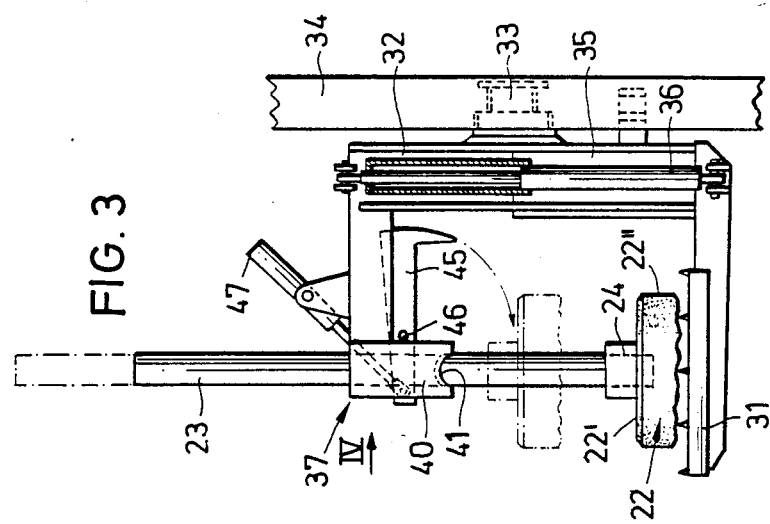

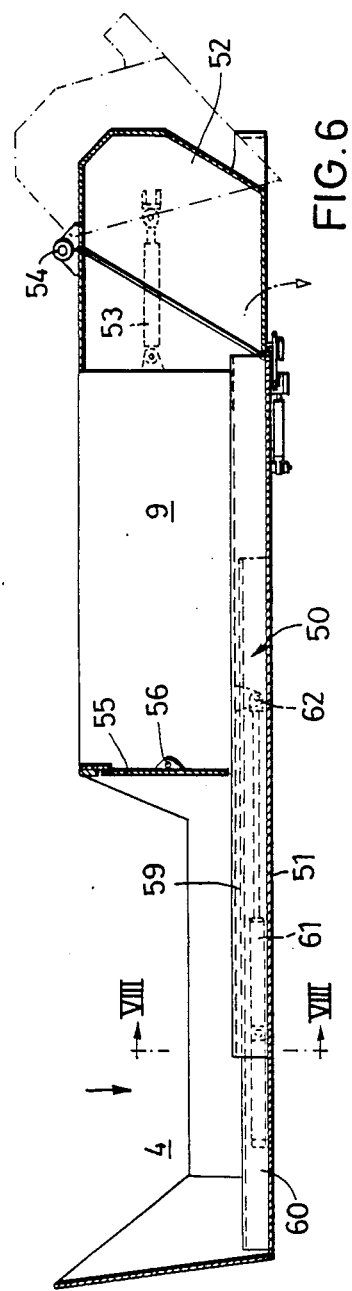
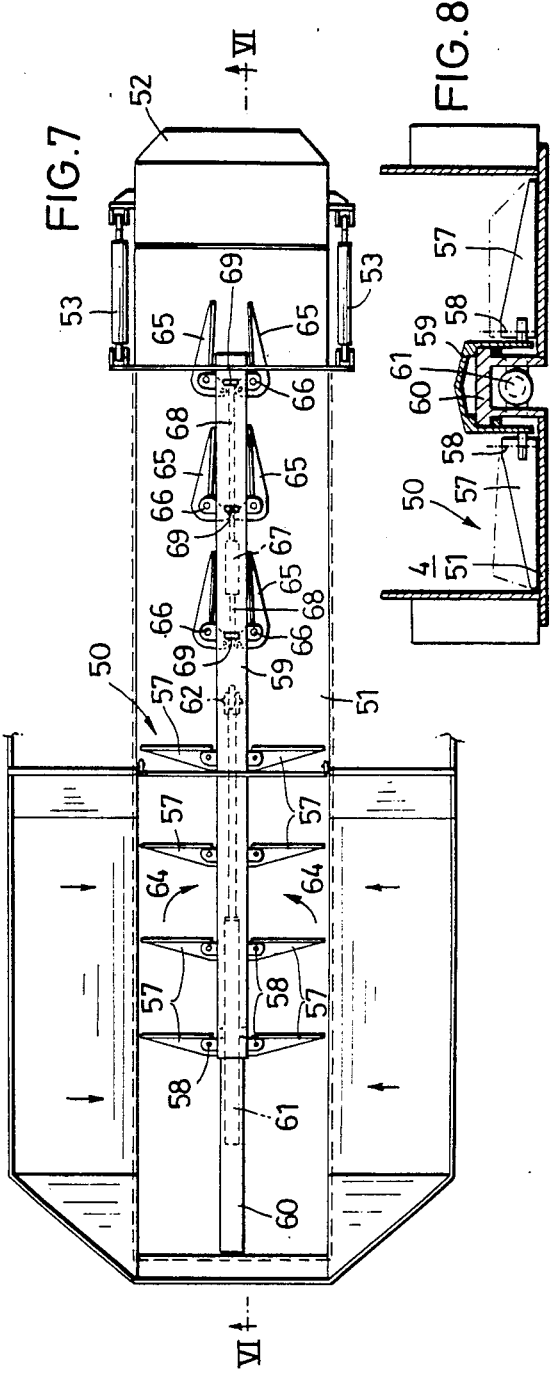

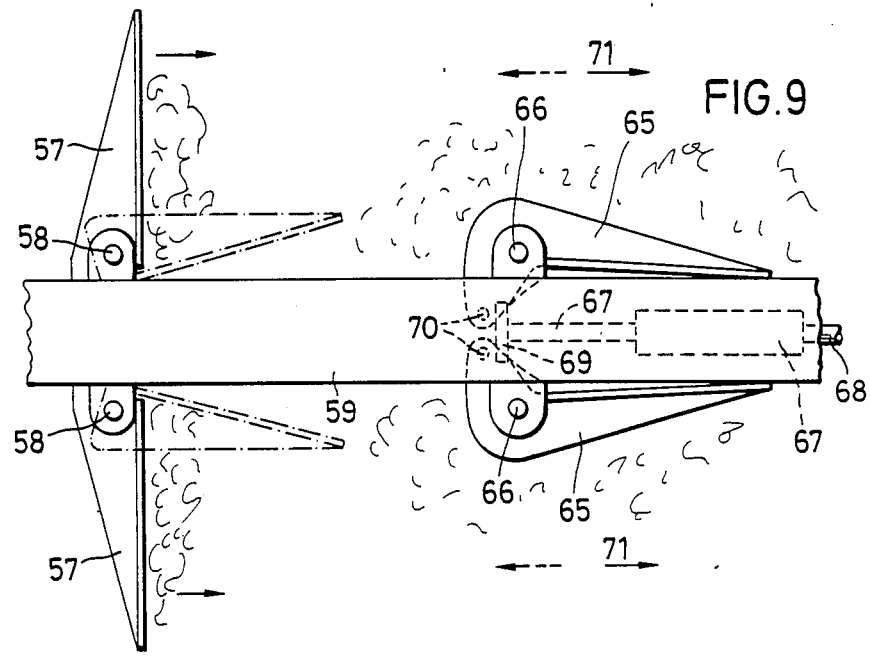
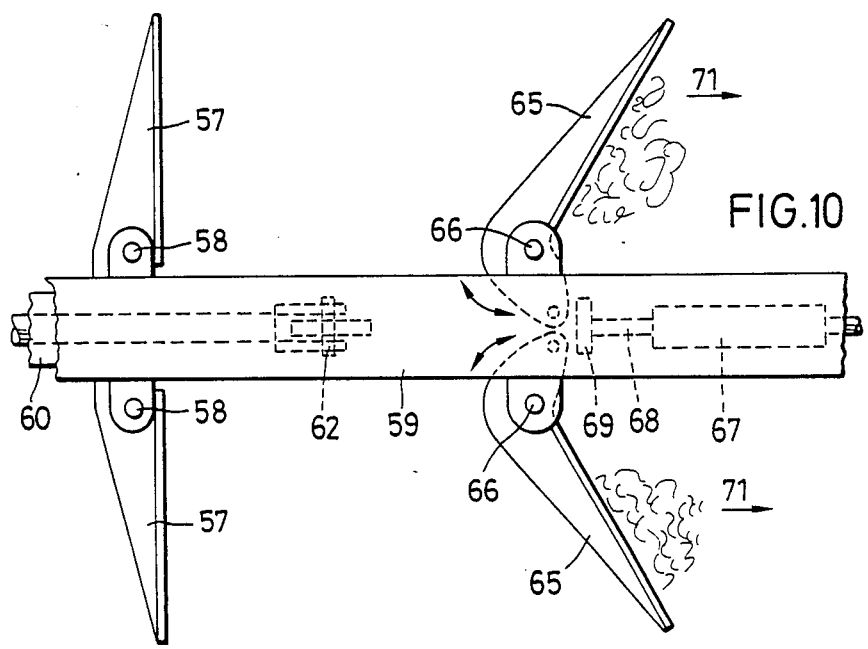

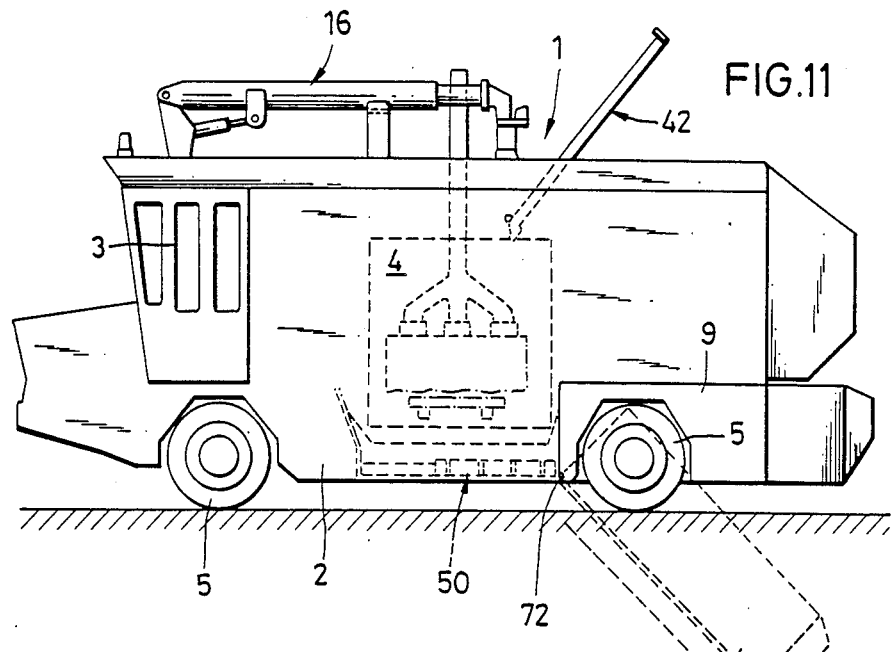
FIG. 11
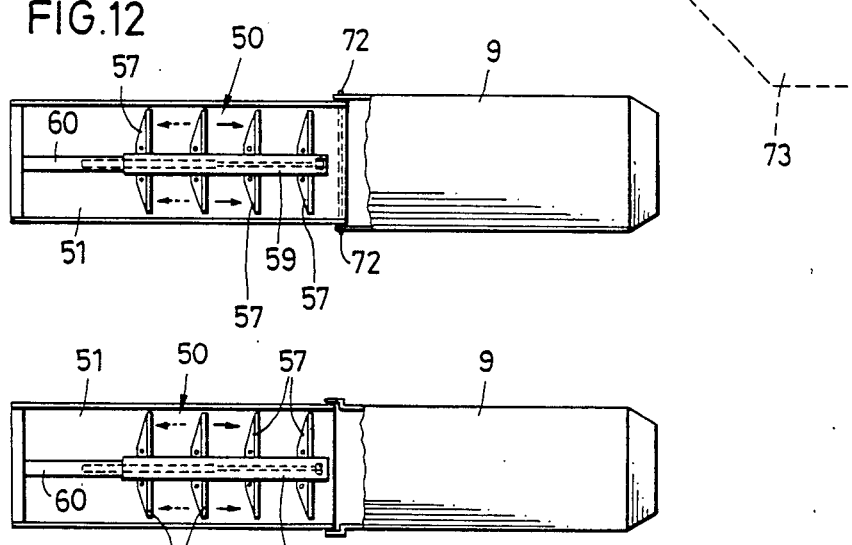
FIG. 12
FIG. 13

MOBILE APPARATUS FOR CLEANING REMNANTS OF CARBON ANODE BLOCKS

BACKGROUND OF THE INVENTION

This invention relates to a mobile apparatus for cleaning bar-mounted remnants of carbon blocks, particularly anode blocks.

As is well known, the used-up carbon anodes (anode remnants as they are called) that occur in, for example, the electrolytic extraction of aluminium, become coated with relatively thick incrustations consisting of a mixture of aluminium oxide and solidified material from the melt. For reasons of economy, it is necessary to remove these incrustations from the anode remnants, so that they may be recyled for use in the electrolysis process, and so that the anode remnants can be used for producing new carbon anodes. In practice, the cleaning of the anode remnants is still mainly carried out manually by using tools such as air lances.

It is also known to carry out the cleaning of anode remnants by mechanical means. (See DE-OS Nos. 3 242 285, 3 032 525 and DE-PS No. 3 227 441). In this case, use is made of a carriage having a pallet (or a crane trolley) for conveying the bar-mounted anode remnants to a stationary cleaning installation which is provided with a breaking tool for separating the incrustations from the remnants. Unfortunately, during transport, some of the adhering melt is lost, and this leads to recycling losses, and also to environmental pollution, since fluorine gas is emitted during cooling.

A mobile anode-block cleaning apparatus is known (see U.S. Pat. No. 4,119,505) which consists of a lifting device and a breaking tool. The lifting device is arranged on a crane trolley, and is used for lifting anode blocks out of an electrolytic bath. The breaking tool is then used to remove the incrustations adhering to the anode remnants, while the remnants are positioned above the melt bath. In this way, the broken-off incrustations are returned directly to the melt bath. The apparatus is controlled from a driving cabin, so that the operator is protected from the heat and dust given off by the remnants. Unfortunately, the use of this apparatus results in substantial environmental pollution.

The aim of the invention is to provide a mobile anode-block cleaning apparatus which can reliably separate anode block remnant incrustations in the vicinity of an electrolytic smelting plant, without excessive environmental pollution.

SUMMARY OF THE INVENTION

The present invention provides mobile apparatus for cleaning bar-mounted remnants of carbon blocks, the apparatus comprising a cleaning cabin accommodating a separator for separating melt incrustations adhering to the remnants, the cleaning cabin being provided with a closable opening through which a remnant to be cleaned is introducable, and through which a cleaned remnant can be withdrawn.

Advantageously, the cleaning cabin forms part of a workshop floor vehicle provided with a propulsion system, and the vehicle is a tired, multi-axle, steerable motor vehicle. Preferably, the vehicle is provided with a driving cabin separate from the cleaning cabin.

This mobile apparatus thus has a cleaning cabin in which the melt incrustations adhering to anode remnants can be separated with the aid of a separator. Consequently, the cleaning operation takes place in a closed chamber, so that environmental pollution (due to dust generation, gas emission and melt losses caused by transport) is avoided or at least extensively suppressed. The high mobility of the apparatus in its configuration as a steerable vehicle, enables several electrolytic smelting plants to be serviced by a single machine. Moreover, this apparatus permits rapid cleaning operations, and hence anode block replacements. In this case, the machine can be driven into the vicinity of the electrolytic smelting plant, from which a used carbon anode is taken. This anode remnant is either directly fed to the cleaning cabin, or firstly set down, for example, on the workshop floor, after which it is transferred to the cleaning cabin for the execution of the cleaning operation.

It is advisable to provide the machine with a collecting chamber for the intermediate storage of the melt incrustations separated from the remnants. From the collecting chamber, the separated incrustations, possibly after comminution, can be fed to a collecting point or directly back to the electrolytic smelting plant.

Advantageously, the apparatus further comprises a filter for cleaning the air in the cleaning cabin, the filter being provided with air suction means.

In a preferred embodiment, the apparatus further comprises a pivotable manipulator for introducing a remnant to be cleaned into the cleaning cabin, and for removing the cleaned remnant from the cleaning cabin. This manipulator can be a vertically and laterally pivotable (and expediently telescopic) gripper arm which can grasp an anode remnant by its bar for introduction into, and withdrawal from, the cleaning cabin.

Preferably, the cleaning cabin is provided with a guide slot through which the bar carrying a remnant can pass. This not only facilitates the placing of a remnant into, and out of, the cleaning cabin, but it also provides the possibility of making the dimensions of the cleaning cabin relatively small. It also permits a remnant to be introduced into the cleaning position within the cleaning cabin, and then be pivoted or rotated in the cleaning position.

The opening in the cleaning cabin may be arranged in one side of the cleaning cabin, and is closable by a gate, preferably a sliding gate. In this case, the guide slot may be arranged on the upper side of the cleaning cabin, and formed as an angled guide slot comprising a guide slot portion extending from the side of the cleaning cabin containing the opening transversely inwards and merging into a longitudinally-extending guide slot portion. This angled guide slot permits an approximately vertical introduction of a remnant into the cleaning cabin, and pivoting of the remnant within the cleaning cabin.

In a preferred embodiment, the cleaning cabin accommodates a table for carrying a remnant to be cleaned. The table may be vertically movable within the cleaning cabin. Advantageously, the table is tiltable about a horizontal axis, and rotatable about an axis perpendicular to the plane of the table. The vertical travel of the the table is utilised for the positioning and fixing of a remnant, while the tilting movement allows the incrustations separated from a remnant to fall down freely. The arrangement is preferably such that the cleaning operation is carried out with the remnant tilted.

Preferably the table is mounted for vertical movement on a bracket provided within the cleaning cabin, the bracket being tiltable, by means of a tilting drive, about the tilt axis; and the bracket is provided with a retaining device for holding the bar of a remnant with the remnant in a working position.

Advantageously, the separator comprises a separator tool movable linearly on an inclined path within the cleaning cabin. The separator may further comprise a pivotable separator tool in addition to the linearly movable separator tool. Conveniently, the apparatus further comprises a device for comminuting the broken-off incrustations removed from the remnants. Preferably, the comminuting device is housed within a wheeled trailer attachable to the vehicle.

Advantageously, a conveyor for discharging the detached incrustations is arranged on the floor of the cleaning cabin. The conveyor may be a shuttle conveyor.

Preferably, the shuttle conveyor has scrapers pivotally attached to both sides of a reciprocable beam, the beam being slidably guided on a central guide member which extends up above the conveyor floor. The apparatus may further comprise a ram for reciprocating the beam, the ram being arranged on the central guide member.

Advantageously, the shuttle conveyor extends from the cleaning cabin into the collecting chamber, the scrapers situated within the collecting chamber are lockable to the beam in pivoted-in positions, and the collecting chamber is provided with a discharge opening closable by a pivotable flap. In this case, the apparatus may further comprise a locking ram arranged in the central guide member, the locking ram being provided with stop members which are engageable with the scrapers in the collecting chamber for locking said scrapers to the beam in pivoted-in positions.

The collecting chamber may be downwardly pivotable or have a downwardly pivotable floor. Alternatively, the conveyor may discharge into a disengageable replaceable store forming the collecting chamber. In this case, the replaceable store may be provided with a discharge conveyor.

BRIEF DESCRIPTION OF THE DRAWINGS

A mobile anode-block cleaning apparatus constructed in accordance with the invention will now be described, by way of example, with reference to the accompanying drawings, in which:

FIG. 3 is a part-sectional side elevation of part of the apparatus, namely a device for retaining, locking and positioning an anode remnant to be cleaned;

FIG. 4 shows the device of FIG. 3 looking in the direction of the arrow IV in FIG. 3;

FIG. 5 shows a detail of the device of FIGS. 3 and 4, namely a holding device acting on an anode bar;

FIG. 6 shows the lower region of the apparatus, and shows a removal conveyor in longitudinal section taken on the line VI—VI of FIG. 7;

FIG. 7 is a plan view corresponding to FIG. 6;

FIG. 8 is a cross-section taken on the line VIII—VIII of FIG. 6;

FIGS. 9 and 10 each show a detail of the conveyor of FIGS. 6 to 8, on larger scale and in plan view;

FIG. 11 is a diagrammatic side elevation of a modified form of apparatus having a hinged-down collecting chamber; and FIGS. 12 and 13 show modified examples of the conveyor and collecting chamber.

DETAILED DESCRIPTION OF PREFERRED EMBODIMENTS

Figure 1:
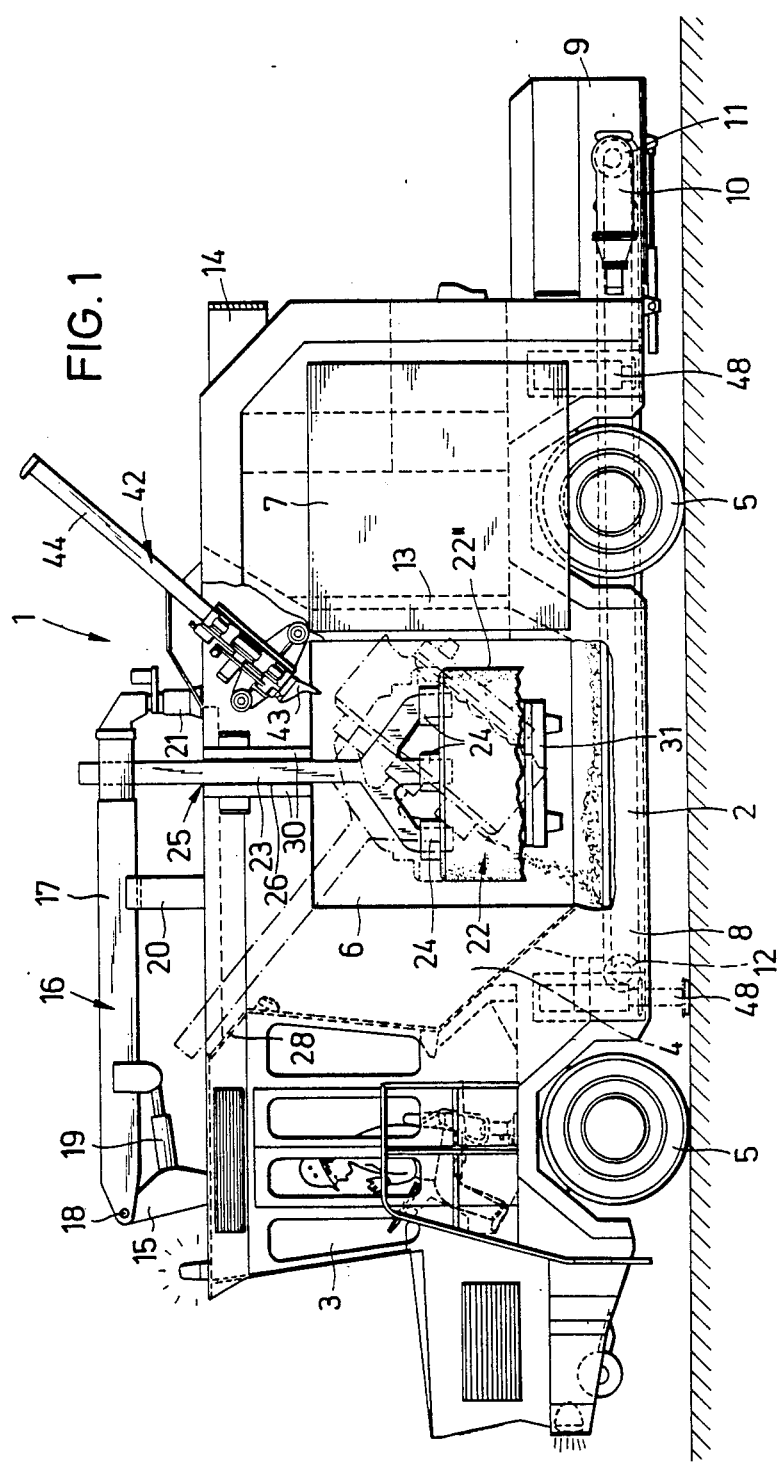
FIG. 1 is a side elevation of the apparatus.

Referring to the drawings, FIG. 1 shows a mobile anode-block cleaning machine constituted by a multi-axled, workshop floor vehicle 1 provided with a propulsion system. The chassis 2 of the vehicle 1 has, at the front, an air-conditioned driving cabin 3 and a separate cleaning cabin 4. The vehicle 1 has wheels 5 provided with pneumatic tires or solid rubber tires. The steering of the front wheels 5 can take place directly or hydraulically. The vehicle 1 preferably has a diesel-hydraulic drive system. A hydraulic pump (not shown) of the hydraulic drive system supplies all the hydraulic users. In the driving cabin 3, which is equipped with an air-conditioning unit (not shown), there is additionally situated a control desk (not shown) for controlling the anode-block cleaning machine in the execution of the cleaning work.

The cleaning cabin 4 has a relatively large lateral opening 6 for the introduction of the anode remnants to be cleaned, and for the withdrawal of the cleaned anode remnants. The lateral opening 6 is closable to the exterior by a sliding gate 7. FIG. 1 shows the sliding gate 7 in the open position, in which it is pushed back towards the rear of the vehicle 1.

As shown in FIG. 1, the internal chamber of the cleaning cabin 4 is generally funnel-shaped, and an endless, heavy duty scraper-chain conveyor 8 extends along its floor to the rear into a collecting chamber 9. A drive 10 for the conveyor 8 is arranged laterally of the collecting chamber 9. The drive 10 includes a drive wheel or drive drum 11, and a reversing wheel or reversing drum 12.

In order to clean the air in the inner chamber of the cleaning cabin 4, especially for the removal of dust from the air, a filter 13 provided with a blower (not shown) is provided behind the cleaning cabin in a housing superstructure. In use, the dust-containing air is sucked by the blower out of the inner chamber of the cleaning cabin 4, and conducted through the filter 13, where dust and other impurities are filtered out. The cleaned air issues, at 14, at the rear of the vehicle.

A manipulator 16 is mounted above the driving cabin 3 on a bearing bracket 15, the manipulator being constituted by a vertically and laterally pivotable, telescopically extensible gripper arm 17, having a horizontal pivot joint 18. A ram 19 is provided for pivoting the gripper arm 17 in a vertical plane. A pivot drive (not shown) is provided for pivoting the entire bearing bracket 15 about a vertical axis, thereby laterally pivoting the gripper arm 17. In the non-working position, the gripper arm 17 rests on a support bracket 20. At its free end, the gripper arm 17 carries a gripper head 21 constituted by, for example, a rotatable exchangeable bell. The manipulator 16 and the gripper arm 17 are used to introduce anode remnants to be cleaned through the lateral opening 6 into the cleaning cabin 4, and to remove cleaned remnants after the cleaning operation is complete.

Figure 2:
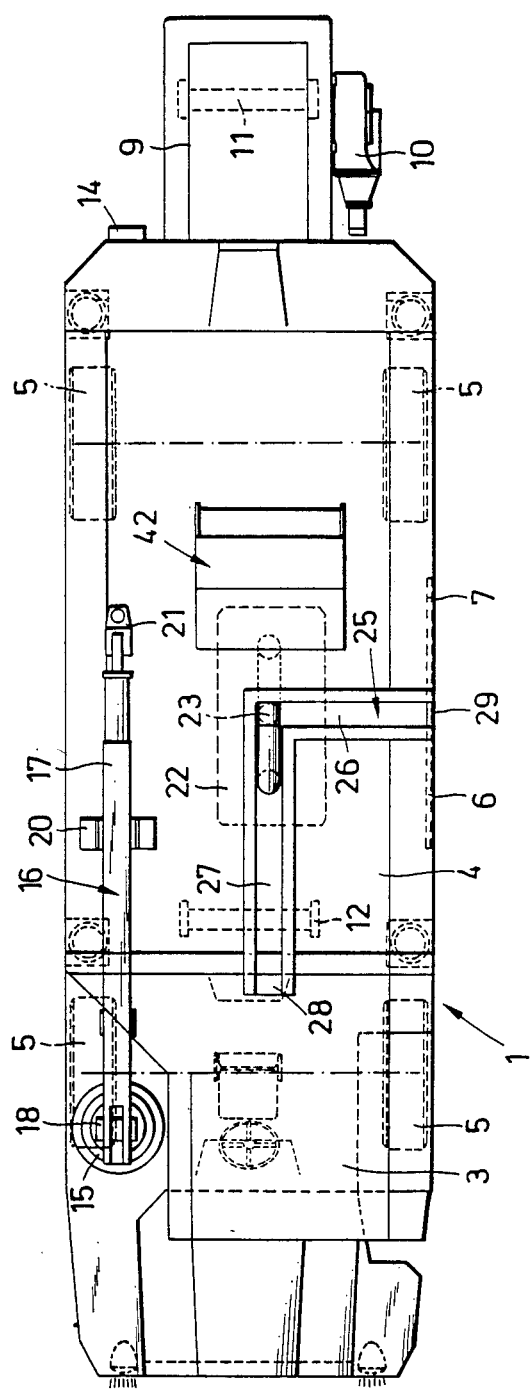
FIG. 2 is a plan view of the apparatus shown in FIG. 1.

The drawings also show an anode remnant 22 in the cleaning cabin 4, the anode remnant being arranged, as usual, on an anode bar 23 having nipples 24 which constitute the connection with the anode remnant. The cleaning cabin 4 has an access opening 25, through which the anode bar 23 extends. Thus, the anode bar 23 protrudes upwards from the inner chamber of the cleaning cabin 4, when its anode remnant 22 is situated in the cleaning cabin. The access opening 25 is formed as a guide slot for the anode bar 23. As shown in FIG. 2, the guide slot 25 is arranged on the upper side of the cleaning cabin 4, and is formed by a transverse guide slot 26 and a longitudinally-extending guide slot 27 at right-angles thereto. The transverse guide slot 26 extends from the vehicle side provided with the opening 6, and merges into the guide slot 27 which extends along the axis of the vehicle 1 and terminates at an inclined surface 28. The transverse guide slot 26 ends, at 29, approximately in the middle of the opening 6. As shown in FIG. 1, the guide slot 26, 27 is defined by two parallel strips 30 of relatively great height.

A table 31 is provided in the inner chamber of the cleaning cabin 4. The table 31 carries the anode remnant 22, and is a combined lifting and tilting table. As shown best in FIGS. 3 and 4, the table 31 is mounted on a bracket 32 which is pivotably mounted, about a horizontal tilting axis 33, on a vertical wall 34 of the cleaning cabin 4. The table 31 is fixed to a carriage 35 which is guided for vertical movement on a vertical carriage guide defined by the bracket 32. At least one double-acting hydraulic lifting ram 36 is provided for lifting the table 31. The table 31 is tilted, together with its bearing bracket 32, about the tilting axis 33 by means of a hydraulic ram 34 (see FIG. 4).

A retaining device 37 is arranged on the bracket 32 above the table 31, the retaining device being provided with clamping claws 38 (see FIG. 5). The clamping claws 38 are pivotably mounted, and are actuatable by means of a clamping ram 39. With the aid of the clamping ram 39 and the clamping claws 38, the anode bar 23 can be clamped fast in a position in which the anode remnant 22 is supported on the table 31. The retaining device 37 is provided with stops 40 having recesses 41 at their lower ends, into which recesses the rear faces 24' of the nipples 24 can engage.

A separator 42 for separating off the melt incrustations adhering to the anode remnant 22 is arranged in the upper region of the cleaning cabin 4, in such a way that it enters the inner chamber thereof from above. The separator 42 is constituted by a cutter tool 43, which is movable on an inclined (at about 50° to the vertical) linear path by means of a hydraulic ram 44.

In use, the mobile cleaning machine can be driven to a working site, which may be situated, for example, in the immediate vicinity of an electrolytic smelting plant where carbon anodes are to be exchanged. Once in position, the machine is supported on downwardly-extensible props 48 arranged on the chassis 2, thereby relieving the wheels 5. With the aid of the manipulator 16, the anode remnants can be taken directly from the plant and introduced into the cleaning cabin 4. Alternatively, an anode remnant to be cleaned can be taken up by the manipulator 16 from the workshop floor and introduced into the cleaning cabin 4. The gripper head 21 of the manipulator 16 is used to grasp the anode bar 23 of a remnant to be cleaned, and to guide the anode block suspended from it through the housing 6 from the side into the inner chamber of the cleaning cabin 4, the anode bar sliding along the guide slot 25. When the anode bar 23 is situated in the transition region between the guides slots 26 and 27 (as shown in FIG. 2), the anode remnant 22 is deposited upon the horizontally-positioned table 31. Then, the table 31, together with the anode remnant 22, is lifted by the lifting ram 36 until the rear faces 24' of the nipples 24 engage within the recesses 41 of the stops 40. Then, the retaining device 37 is actuated, whereby the clamping claws 38 are pivoted by the clamping ram 39 against the anode bar 23, thereby locking the anode bar with its anode remnant 22 to the table 31. The table 31 is then tilted about the tilt axis 33 (into the oblique position shown in dot-dash lines in FIG. 1) using the hydraulic ram 34. In the tilted position, the upper side of the anode remnant 22, on which the incrustations from the bath melt are situated, is oriented exactly in line with the path of movement of the tool 43. The gate 7 is then closed, and the blower of the filter 13 is switched on. Then the hydraulic ram 44 is actuated, so that the tool 43 moves over the upper side of the anode remnant 22, and in doing so separates off the incrustations, possibly with simultaneous shaking or hammering. The incrustations fall downwards, because of the inclined position of the anode remnant 22 and the table 31, and on to the conveyor 8 which carries them away into the collecting chamber 9.

As the table 31 is tilted into the working position, the anode bar 23 slides forward in the guide slot 27, possibly until it abuts the oblique face 28. If desired, after this cleaning step, the anode remnant 22 can be turned through 180° about the longitudinal axis of its anode bar 23, whereupon the incrustations on the opposite side of the anode remnant are removed with the aid of the tool 43. In order to effect this turning operation, the table 31 is rotatable about an axis which coincides with the axis of the anode bar 23 when locked on the table. In general, it is sufficient if only the incrustations on the upper side 22' of the anode remnant 22 are removed, these incrustations being in a thick layer of up to 30 cm and above. If desired, however, the incrustations on the side and circumferential surfaces 22" of the anode remnant 22 can be removed by the separator 42. For this purpose, the table 31 must possess the requisite freedom of movement to enable the anode remnant 22 to be correctly positioned in the path of the tool 43. Alternatively, in order to clean the side faces 22", additional separating tools can be provided in the cleaning cabin 4. It is further advisable to provide a further separating tool 45, which is pivotable (as shown in FIG. 3) by means of a pivot ram 47 about a horizontal pivot axis 46. This pivotable separating tool 45 is used to remove incrustations which are situated between the nipples 24 on the upper side 22' of the anode remnant 22. In this case, the table 31 is pivoted into the horizontal position, so that the anode remnant 22 is positioned as shown in dot-dash lines in FIG. 3, and so that the teeth or blades of the separator tool 45 can be moved over the upper side 22' of the anode remnant and through the spaces between the nipples 24.

As soon as the incrustations are removed from the anode remnant 22, the table 31 is pivoted into the horizontal position again. After release of the retaining device 37 and opening of the gate 7, the cleaned anode remnant 22 can be guided laterally out of the cleaning cabin 4 by the manipulator 16, the gripper head 21 of which acts on the anode bar 23 protruding at the top from the cleaning cabin. The cleaned remnant 22 is then deposited on the workshop floor, or on a transport pallet. Alternatively, it can be transferred to another conveyor for carrying the cleaned anode remnant away to a preparation plant. The incrustations detached from the anode remnant 22 pass into the closed collecting chamber 9 where they are stored temporarily. The dust collected by the filter 13 can likewise be conducted away into the collecting chamber 9. The control of all operations can take place from the driving cabin 3.

The anode-block cleaning machine described above can be equipped with a comminuting device for comminuting the incrustations stripped off from the anode remnants, either before they pass into the collecting chamber 9 or as they are removed from the collecting chamber. The comminuting device may be, for example, a wheeled trailer which is coupled to the rear to the anode-block cleaning machine above the collecting chamber 9. A crusher roller is arranged in a closed chamber within the trailer, the crusher roller being used to comminute the incrustations.

It will be apparent that modifications could be made to the machine described above. In particular, the separators 42 and 45 may be of any suitable known type. The separator 42 could also be mounted for pivoting in the vertical plane, so that it could be pivoted from the illustrated working position (in which it is situated in the desired oblique position) into a horizontal position, in which its ram 44 lies flat on the upper side of the vehicle superstructure.

In place of the relatively heavy scraper-chain conveyor 8, it is possible to use a conveyor of flat and light construction. For example, a shuttle conveyor 50 as shown in FIGS. 6 to 8 could be used. The shuttle conveyor 50 has a conveying surface 51 which forms the floor of the cleaning cabin 4 and of the collecting chamber 9. The collecting chamber 9 is provided, at the rear of the vehicle 1, with a discharge opening closable by means of a pivotable flap 52. The flap 52 is pivotable by means of hydraulic pivot rams 53 from the closed position (shown in solid lines in FIG. 6) into the open position (shown in dot-dash lines) so that the collecting chamber 9 can be emptied, for example into a deep store. The collecting chamber 9 is separated from the cleaning cabin 4 by means of a partition 55 which is pivotable about a horizontal axis 56. The shuttle conveyor 50 is a double-armed shuttle conveyor, the scrapers 57 of which are attached by vertical pivot joints 58 to both sides of a reciprocable beam 59. The beam 59 is guided on a central U-shaped guide 60 extending up above the conveyor floor 51. The guide 60 accommodates a double-acting hydraulic ram 61 whose piston rod is attached, by a pivot joint 62, to the beam 59.

When the ram 61 is extended, the beam 59 moves in the conveying direction, so that the scrapers 57 transport the incrustations detached from the anode remnants from the cleaning cabin 4 into the collecting chamber 9. When the ram 61 is retracted, the beam 59 moves in the opposite direction, and the scrapers 57 pivot, in the direction of the arrow 64 (see FIG. 7) laterally against the beam, so that they perform no appreciable conveying work. When the ram 61 is again extended, the scrapers 67 pivot back into the working position, so that they can convey the loose material over the conveyor floor 51 towards the collecting chamber 9.

In order to discharge the material from the collecting chamber 9, the shuttle conveyor 50 extends through the cleaning cabin 4, and substantially through the collecting chamber 9 as far as its discharge opening. Within the collecting chamber 9, the shuttle conveyor 50 has further scrapers 65 attached to the beam 59 by pivot joints 66. The scrapers 65 are substantially the same as the scrapers 57. The scrapers 65 can be locked in the hinged-in position (see FIGS. 7 and 9) in which they abut the sides of the beam 59, so that they normally perform no conveying work when the flap 52 of the collecting chamber 9 is closed, and the collecting chamber is being filled with incrustations carried in by the scrapers 57. A hydraulic pivot ram 67 is associated with the scrapers 65. The ram 67 is positioned within the central guide 60, and has a piston rod 68 protruding at both ends. The piston rod 68 is provided with projections 69 for engaging the scrapers 65. In particular, the projections 69 engage stops 70 formed on the shorter lever arms of the scrapers 65 (which are in effect two-armed levers). When the projections 69 engage the stops 70, the scrapers 65 are locked in their pivoted-in rest positions. When the piston rod 68 is displaced, the projections 69 move out of engagement with the stops 70, thereby liberating the scrapers 65, which can then pivot freely out into the conveying position when the beam 59 is moving in the conveying direction 71 (see FIGS. 9 and 10). As mentioned, the scrapers 65 are liberated only when the collecting chamber 9 is to be emptied and the flap 52 is opened. The other scrapers 57 can here freely accompany the movement. This manner of operation is shown in FIG. 10. When the closed collecting chamber 9 is being filled, on the other hand, the scrapers 65 are hinged in and locked against the beam 59, as shown in FIGS. 7 and 10.

It is also possible to couple the scrapers 65 with the reciprocating drive and the hydraulic ram 67 in such a way that these scrapers can be pivoted in positively by the ram 67. Separate rams 67 can also be allocated to the individual pairs of scrapers 65.

FIGS. 11 and 12 show an anode-block cleaning machine having a shuttle conveyor 50 which discharges into a collecting container 9 serving as an intermediate store. The container 9 is pivotably mounted, about a horizontal pivot axis 72, on the chassis 2 of the vehicle 1. The shuttle conveyor 50 conveys the incrustations detached from the anode remnants into the collecting container 9 which is situated in a hinged-up position. In order to empty the filled collecting container 9, this is tilted into the position 9' shown in chain lines in FIG. 11, so that the contents of the container can be discharged, with the discharge opening of the container opened, for example into a deep store 73. The pivoting movement of the collecting container 9 can be accomplished by, for example, hydraulic pivot rams.

In a modification of the embodiment of FIGS. 11 and 12, the arrangement is such that only the bottom part of the collecting container 9 is pivoted downwards for discharge.

FIG. 13 shows a machine having a shuttle conveyor 50 which discharges into a replaceable store forming the collecting chamber 9. The replaceable store 9 is mounted detachably, on the vehicle 1 in such a way that, when filled, it can be separated from the vehicle. The replaceable store 9 may have a separate discharge conveyor, for example a hydraulically driven chain conveyor, for discharging the stored incrustations when it is full.

In the machines described above with reference to FIGS. 11 to 13 (in comparison with the arrangement of FIGS. 6 to 8) a shuttle conveyor of comparatively short construction is required.

We claim:

1. Mobile apparatus for cleaning bar-mounted remnants of carbon anode blocks, the apparatus comprising a cleaning cabin accommodating a separator for separating melt incrustations adhering to the remnants, the cleaning cabin having a closable opening through which a remnant to be cleaned is introducable, and through which a cleaned remnant can be withdrawn, wherein the cleaning cabin forms part of a workshop floor vehicle provided with a propulsion system.

2. Apparatus according to claim 1, wherein the vehicle is a tired, multi-axle, steerable motor vehicle.

3. Apparatus according to claim 1, wherein the vehicle is provided with a driving cabin separate from the cleaning cabin.

4. Apparatus according to claim 1, further comprising a filter for cleaning the air in the cleaning cabin, the filter having air suction means.

5. Apparatus according to claim 1, further comprising a pivotable manipulator for introducing a remnant to be cleaned into the cleaning cabin, and for removing the cleaned remnant from the cleaning cabin.

6. Apparatus according to claim 1, wherein the opening is arranged in one side of the cleaning cabin, and is closable by a gate.

7. Apparatus according to claim 6, wherein the gate is a sliding gate.

8. Apparatus according to claim 1, wherein the cleaning cabin has with a guide slot through which the bar carrying a remnant can pass.

9. Apparatus according to claim 8, wherein the guide slot is arranged on the upper side of the cleaning cabin, and formed as an angled guide slot comprising a guide slot portion extending from the side of the cleaning cabin containing the opening transversely inwards and merging into a longitudinally-extending guide slot portion.

10. Apparatus according to claim 1, wherein the cleaning cabin accommodates a table for carrying a remnant to be cleaned.

11. Apparatus according to claim 10, wherein the table is vertically movable within the cleaning cabin.

12. Apparatus according to claim 11, wherein the table is tiltable about a horizontal axis.

13. Apparatus according to claim 12, wherein the table is mounted for vertical movement on a bracket provided within the cleaning cabin, the bracket being tiltable, by means of a tilting drive, about the tilt axis.

14. Apparatus according to claim 13, wherein the bracket has a retaining device for holding the bar of a remnant with the remnant in a working position.

15. Apparatus according to claim 11, wherein the table is rotatable about an axis perpendicular to the plane of the table.

16. Apparatus according to claim 1, wherein the separator comprises a separator tool movable linearly on an inclined path within the cleaning cabin.

17. Apparatus according to claim 16, wherein the separator further comprises a pivotable separator tool in addition to the linearly movable separator tool.

18. Apparatus according to claim 1, further comprising a device for comminuting the broken-off incrustations removed from the remnants.

19. Apparatus according to claim 18, wherein the comminuting device is housed within a wheeled trailer attachable to the vehicle.

20. Apparatus according to claim 1, further comprising a collecting chamber for the reception of the incrustations removed from the remnants.

21. Apparatus according to claim 20, wherein the collecting chamber is downwardly pivotable.

22. Apparatus according to claim 20, wherein the conveyor discharges into a disengageable replaceable store forming the collecting chamber.

23. Apparatus according to claim 1, wherein a conveyor for discharging the detached incrustations is arranged on the floor of the cleaning cabin.

24. Apparatus according to claim 23, wherein the conveyor is a shuttle conveyor.

25. Apparatus according to claim 24, wherein the shuttle conveyor has scrapers pivotally attached to both sides of a reciprocable beam, the beam being slidably guided on a central guide member which extends up above the conveyor floor.

26. Apparatus according to claim 25, further comprising a ram for reciprocating the beam, the ram being arranged on the central guide member.

27. Apparatus according to claim 24, wherein the shuttle conveyor extends from the cleaning cabin into the collecting chamber, wherein the scrapers situated within the collecting chamber are lockable to the beam in pivoted-in positions, and wherein the collecting chamber is provided with a discharge opening closable by a pivotable flap.

28. Apparatus according to claim 27, further comprising a locking ram arranged in the central guide member, the locking ram having stop members which are engageable with the scrapers in the collecting chamber for locking said scrapers to the beam in pivoted-in positions.

* * * * *